US00H002058H

(19) United States

(12) Statutory Invention Registration

Brandolini et al.

(10) Reg. No.: US H2058 H

(43) Published: Jan. 7, 2003

(54) CO-CATALYSTS FOR METALLOCENE COMPLEXES IN OLEFIN POLYMERIZATION REACTIONS

(75) Inventors: A. J. Brandolini, Somerville, NJ (US); Yury Viktorovich Kissin, East Brunswick, NJ (US); Robert Ivan Mink, Warren, NJ (US); Thomas E. Nowlin, Princeton Junction, NJ (US)

(73) Assignee: Mobil Oil Corporation, Fairfax, VA (US)

(21) Appl. No.: 09/664,137

(22) Filed: Sep. 18, 2000

Related U.S. Application Data

(60) Provisional application No. 60/156,238, filed on Sep. 27, 1999.

(51) Int. Cl.[7] ..... B01J 31/00

(52) U.S. Cl. ..... 502/115

*Primary Examiner*—Michael J. Carone

*Assistant Examiner*—Aileen J. Baker

(74) *Attorney, Agent, or Firm*—Joseph F. Reidy; Stephen D. Prodnuk

(57) ABSTRACT

The present invention provides cocatalysts for activating metallocene complexes in olefin polymerization reactions, and metallocene catalyst systems using the cocatalysts. The cocatalysts of the present invention include: (a) a halo-organoaluminum compound of the formula $Al_nR_mX_{3n-m}$, where Al is aluminum, each R is independently a $C_l$ to $C_4$ alkyl group, X is a halide, n is 1 or 2, and m is determined by the valency of Al; and (b) a dialkylmagnesium compound of the formula $MgR'_2$, where Mg is magnesium and R' is a $C_2$ to $C_6$ alkyl group. The components (a) and (b) are used in amounts such that the molar ratio of Al:Mg is at least 2, preferably from 2:1 to 5:1.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CO-CATALYSTS FOR METALLOCENE COMPLEXES IN OLEFIN POLYMERIZATION REACTIONS

CROSS-REFERENCE TO RELATED APPLICATIONS

This application claims the benefit of U.S. provisional application No. 60/156,238, filed Sep. 27, 1999, the disclosure of which is incorporated herein by reference.

FIELD OF THE INVENTION

The present invention is directed generally to catalyst systems for polymerizing olefins. More specifically, the present invention provides novel cocatalysts or activators suitable for activating metallocene catalysts for olefin polymerization, supported catalyst systems including the novel catalysts and metallocene catalysts, and methods of polymerizing olefins using the supported catalyst systems.

BACKGROUND

Activation of metallocene complexes for olefin polymerization requires the use of a cocatalyst or activator. Only a limited number of such cocatalysts are known. One type of cocatalyst includes dialkylaluminum chlorides and trialkylaluminum compounds. Dialkylaluminum chlorides work well only with titanocenes (Natta, J., Pino, P., Mazzanti, G. and Giannini, U., *J. Am. Chem. Soc.* 79, 2975 (1957), and Breslow, D.S. and Newburg, N.R., *J. Am. Chem. Soc.* 79, 5072 (1957)). Some trialkylaluminum compounds are known to activate zirconocenes, but are very poor cocatalysts for metallocene complexes (U.S. Pat. No. 2,924,593). Another type of cocatalyst includes alkylalumoxanes. These cocatalysts are described in Andersen et al., *Angew. Chem., Int. Ed. Engl.* 15, 630 (1976); Sinn, H. and Kaminsky, W., *Adv. Organomet. Chem.* 18, 99 (1980); and Sinn, H., Kaminsky, W., Vollmer, H.J. and Woldt, R., *Angew. Chem., Int. Ed. Engl.* 19, 390 (1980). A combination of trimethylaluminum and dimethylaluminum fluoride is also known (Zambelli, A., Longo, P., and Grassi, A., *Macromolecules* 22, 2186 (1989)). Additional cocatalysts include compounds or salts which generate non-coordinative anions such as $[R_3NH]^+[B(C_6F_5)_4]^-$; see, Ewen, J.A. et al., *Makromol. Chem. Macromol. Symp.* 4849, 253 (1991); Taube, R. and Krukowka, L., *J. Organomet. Chem.* 347, C9 (1988); Bochman, M. and Jaggar, A.J., *J. Organomet. Chem.* 424, C5–C7 (1992); and Herfert, N. and Fink, G., *Makromol Chem. Rapid Commun.* 14, 91-96 (1993).

Certain zirconium complexes containing pi-bonded organic ligands, such as bis(cyclopentadienyl)zirconium complexes, activated with an alumoxane, are particularly effective catalysts; see, e.g., U.S. Pat. Nos. 4,542,199 and 4,404,344. However, although such zirconium-based catalysts are very effective olefin polymerization catalysts, the alumoxane cocatalysts are expensive and can be utilized efficiently only if the olefin polymerization reaction can be carried out in aromatic solvents (generally in toluene).

Thus, there is a need in the art for cocatalysts capable of efficiently activating metallocene complexes, particularly zirconium, titanium and hafnium complexes. In addition, there is a need for alternative, less expensive cocatalysts effective for activating metallocene complexes.

SUMMARY OF THE INVENTION

The present invention provides a new type of cocatalyst which is capable of activating metallocene complexes in olefin polymerization reactions. The cocatalyst of the present invention in general includes: (a) a halo-organoaluminum compound of the formula:

$$Al_nR_mX_{3n-m}$$

where Al is aluminum, each R is independently a $C_1$ to $C_4$ alkyl group, X is a halide, n is 1 or 2, and m is determined by the valency of Al; and (b) a dialkylmagnesium compound of the formula:

$$MgR'_2$$

where Mg is magnesium and R' is a $C_2$ to $C_6$ alkyl group. The components (a) and (b) are used in amounts such that the molar ratio of Al:Mg is at least 2, preferably from 2:1 to 5:1.

Cocatalysts of the present invention can be used in combination with metallocene catalysts to form active metallocene catalyst systems, preferably supported metallocene catalyst systems. Thus, the present invention also provides novel supported metallocene catalyst systems including a cocatalystactivator as described above, a metallocene catalyst, and a support. In the case of zirconocene complexes, each component, if used alone, does not produce an olefin polymerization catalyst, but when the components are used together, they readily activate metallocene complexes for polymerization reactions. The present invention is further directed to methods of polymerizing olefins, particularly ethylene or ethylene and an alpha olefin comonomer, using the supported metallocene catalyst systems.

DETAILED DESCRIPTION OF THE INVENTION

Cocatalysts or activators of the present invention include a halo-organoaluminum compound and a dialkylmagnesium compound. The halo-organoaluminum compound is a compound represented by the formula:

$$Al_nR_mX_{3n-m}$$

where Al is aluminum, each R is independently a $C_1$ to $C_4$ alkyl group, X is a halide, n is 1 or 2, and m is determined by the valency of Al. Preferred examples of suitable halo-organoaluminum compounds include those in which R is methyl or ethyl and X is chlorine or fluorine. In particular, preferred halo-organoaluminum compounds include $AlEt_2Cl$, $AlMe_2Cl$, $Al_2Et_3Cl_3$ and $AlEt_2F$, where Me is methyl and Et is ethyl. These compounds are generally commercially available or can be synthesized by methods well known in the art; the compounds used in the Examples herein were obtained commercially from Akzo Nobel Co.

The dialkylmagnesium compound is a compound of the formula:

$$MgR'_2$$

where Mg is magnesium and each R' is independently a $C_2$ to $C_6$ alkyl group. Preferred dialkylmagnesium compounds include those in which each R' is butyl or hexyl. These dialkylmagnesium compounds are generally commercially available or can be synthesized by methods well known in the art; dibutyl magnesium ("$MgBu_2$") and dihexyl magnesium ("$MgHex_2$") used in the Examples herein were obtained from FMC and from Akzo Nobel Co., respectively.

The halo-organoaluminum compound and the dialkylmagnesium compound are used in amounts such that the molar ratio of Al:Mg is at least 2, and generally in the range of from 2:1 to 5:1. It should be appreciated that Al:Mg ratios outside of this range may still provide some activation of the metallocene catalyst, but the activation is generally poor compared to catalyst systems using the preferred molar ratios.

Chloro-organoaluminum compounds and dialkylmagnesium compounds react rapidly with the formation of finely dispersed white solids. When this reaction is carried out in aliphatic solvents such as n-heptane or isohexane, the precipitation is quite rapid and produces a white voluminous mass which is soluble in water, THF, and acetone. In aromatic solvents such as toluene, the same reaction is slower and produces finely dispersed solid particles which remain in a quasi-colloidal state for long periods of time. $^{13}C$ NMR analysis of liquid products formed in the reaction of $AlMe_2Cl$ and $MgBu_2$ at an Al:Mg molar ratio of 2, for example, showed that both $AlMe_2Cl$ (based on the $CH_3$ signal at −6.5 ppm) and $MgBu_2$ (based on the $\alpha$-$CH_2$ signal at +9.5 ppm) are fully consumed in the reaction, and a new product, with a $CH_3$ signal at −8.0 ppm and the $\alpha$-$CH_2$ signal at +10.8 ppm, is formed. Without wishing to be bound by theory, comparison with spectra of various organoaluminum compounds ($AlMe_3$ and $AlHex_3$) suggests that the most probable reaction is:

$$2\ AlMe_2Cl + MgBu_2 \rightarrow MgCl_2 + 2AlMe_2n\text{-}Bu$$

X-ray analysis of the solid product formed in this reaction confirmed formation of finely dispersed $MgCl_2$; see Chien, J.C.W., Wu, J.C., and Kao, C.I., *J. Polym. Sci., Chem.* 21, 737 (1982). Its main broad reflections were at 2θ=~16, ~31, 51 and ~60°. However, chemical analysis of the precipitates revealed a more complex picture. The solid formed in the mixture of $AlEt_2Cl$ and $MgBu_2$ at an Al:Mg molar ratio of 2 (25° C., overnight) has an empirical formula $MgCl_2 \cdot 0.4$ ($AlR_2Cl$) (R~$C_4$). Analysis of the solid produced in the mixture of $Al(i\text{-}Bu)_2Cl$ and $MgHex_2$ at an Al:Mg molar ratio of 1 (25° C., overnight, reprecipitated from ethanol) also showed the presence of Al in the solid, with an Al:Mg molar ratio of 0.13. Gas chromatographic analysis of organic products generated during dissolution of the thoroughly washed solid in ethanol indicated the presence of isobutane and n-hexane in a 3:1 molar ratio. Similarly, a reaction between $AlMe_2Cl$ and $MgBu_2$ at an Al:Mg molar ratio of 2 produced a solid containing Al with an Al:Mg molar ratio of 0.07.

When the products of the reaction between $AlR_2Cl$ and $MgR_2'$ were combined with metallocene complexes of Ti, Zr or Hf (either unsubstituted metallocenes or their ring-substituted analogues), they formed catalytically active systems for the polymerization of ethylene and alpha-olefins. The polymerization reactions were typically carried out in aliphatic hydrocarbons with an $AlR_2X$:$MgR_2'$ molar ratio from 2 to 5 and a temperature range from 20 to 90° C. The [Al]:[transition metal] molar ratio can vary from 500 to 2000. Table 1 shows several polymerization reactions using the unsubstituted zirconocene complex $Cp_2ZrCl_2$.

TABLE 1

Polymerization with $Cp_2ZrCl_2$ Activated with $AlR_2X$—$MgBu_2$ and $AlR_2X$—LiBu

| Cocatalyst | [Al], [Mg] (mmol) | [Zr] (mmol) | T (° C.) | $P_E$[a] (MPa) | $C_{Hex}$[b] (M) | Yield (g) |
|---|---|---|---|---|---|---|
| $MgBu_2$ | 0, 1.5 | $7 \times 10^{-3}$ | 60 | 1.24 | 0 | 0 |
| $AlEt_2Cl$ | 7.5, 0 | $1 \times 10^{-3}$ | 80 | 1.03 | 0 | 0 |
| $AlEt_2Cl$ | 1.5, 0 | $1.4 \times 10^{-2}$ | 60 | 0.82 | 3.2 | ~0.1[c] |
| $AlEt_2Cl$/ $MgBu_2$ | 7.5, 2.0 | $1.0 \times 10^{-2}$ | 80 | 1.03 | 0 | 56.3 |
| $AlEt_2Cl$/ $MgBu_2$ | 7.5, 2.0 | $1.0 \times 10^{-2}$ | 80 | 1.03 | 2.7 | 45.7 |
| $AlEt_2Cl$/ $MgBu_2$ | 1.5, 0.8 | $3.3 \times 10^{-2}$ | 80 | 0.82 | 3.9 | 55.8 |
| $AlMe_2Cl$/ $MgBu_2$ | 7.5, 2.0 | $7 \times 10^{-3}$ | 80 | 1.24 | 3.2 | 23.1 |
| $AlEt_2F$/ $MgBu_2$ | 4.5, 1.0 | $6 \times 10^{-3}$ | 60 | 1.24 | 3.2 | 15.6 |
| $AlMe_2Cl$/ sec-BuLi | 2.0, 1.0 | $3.4 \times 10^{-3}$ | 70 | 1.03 | 1.3 | 12.9 |

[a]partial pressure of ethylene

[b]molar concentration of 1-hexene in solution

[c]cationic oligomers of 1-hexene

Neither $MgBu_2$ nor $AlEt_2Cl$, when used alone, activated the zirconocene complex (although $AlEt_2Cl$ initiated cationic polymerization of 1-hexene), but combinations of $AlEt_2Cl$ and $Mg(n\text{-}Bu)_2$ were quite effective cocatalysts. An Al:Mg molar ratio from 2:1 to 5:1 was needed for a catalytic effect; the same combinations at an Al:Mg ratio less than 1 were virtually inactive. In the case of ethylene copolymerization reactions, polymer yields ranged from 2500 to 10,000 g/mmol of Zr. Comparison with MAO as a cocatalyst showed that $AlR_2Cl$—$MgR_2'$ combinations were 5–10 times less active (per mole of the zirconocene complex).

Two other combinations of organometallic compounds are also capable of activating metallocene complexes: $AlR_2F$ and $MgR_2'$; and $AlR_2Cl$ and LiR'. However, none of the cocatalyst combinations was effective when $(C_5Me_5)_2ZrCl_2$ was used as a zirconocene complex, in contrast to MAO. Combinations of $AlEt_2Cl$ and $MgBu_2$ also readily activate metal-alkylated zirconocene complexes ($Cp_2ZrMe_2$), zirconocenes with alkyl substituted cyclopentadienyl rings, as well as metallocene complexes with bridged cyclopentadienyl rings (Table 2).

Table 2 also shows results of ethylene/1-hexene copolymerization reactions using supported metallocene catalysts. The catalysts can be supported on conventional supports, preferably silica, using methods well known to those skilled in the art (see, e.g., U.S. Pat. No. 5,506,184, the disclosure of which is incorporated herein by reference), and as shown in the Examples herein.

TABLE 2

Ethylene/α-olefin Copolymerization with Bridged Metallocene Complexes Activated with $AlEt_2Cl$—$MgBu_2$ and with $AlMe_2Cl$—$MgBu_2$ Mixtures (Al:Mg = 2.8 to 3.0)

| Catalyst | T (° C.) | $P_E$[a] (MPa) | α-olefin | $C_{olef}$[b] (M) | Yield (g/mmol Zr) | $C_{olef}^{copol}$ (mol %) |
|---|---|---|---|---|---|---|
| $(n\text{-}BuCp)_2ZrCl_2$ | 80 | 1.03 | 1-hexene | 1.38 | 6000 (0.5 h) | 0.9 |
| $C_2H_4(Ind)_2ZrCl_2$ | 80 | 0.41 | propylene | 0.23 MPa | 1200 (1 h) | 9.0 |
| $C_2H_4(Ind)_2ZrCl_2$ | 80 | 1.25 | 1-hexene | 1.66 | 12400 (0.5 h) | 5.3 |
| $C_2H_4(Ind)_2ZrCl_2$ | 80 | 1.25 | 1-hexene | 1.38 | 18000 (2 h) | 2.0 |
| $C_2H_4(Ind)_2ZrCl_2$ | 80 | 1.26 | 1-hexene | 0.80 | 5200 (2 h) | 0.6 |
| $C_2H_4(Ind)_2ZrCl_2$ | 90 | 1.30 | 1-hexene | 1.75 | 6900 (1 h) | 4.7 |
| $Me_2Si(Ind)_2ZrCl_2$ | 80 | 1.26 | 1-hexene | 0.90 | 6250 (2 h) | 0.7 |
| $Me_2Si(Cp)(Flu)ZrCl_2$ | 90 | 1.30 | 1-hexene | 1.75 | 6700 (1 h) | 3.4 |
| | | Silica-Supported Catalysts | | | | |
| $C_2H_4(Ind)_2ZrCl_2$ | 90 | 1.30 | 1-hexene | 1.75 | 7800 (1 h) | 4.4 |
| $C_2H_4(Ind)_2ZrCl_2$[c] | 90 | 1.30 | 1-hexene | 1.75 | 4900 (1 h) | 2.4 |
| $Me_2Si(Cp)(Flu)ZrCl_2$ | 90 | 1.03 | 1-hexene | 1.75 | 750 (1 h) | — |

[a]partial pressure of ethylene
[b]molar concentration of 1-hexene in solution
[c]$AlMe_2Cl$—$Mg(n\text{-}Bu)_2$ combination was used as a cocatalyst The $AlR_2Cl$—$MgR_2'$ combinations can also activate bridged metallocene complexes in stereospecific polymerization of α-olefins. Polymerization of propylene with $C_2H_4(Ind)_2ZrCl_2$ activated by $AlEt_2Cl$—$MgBu_2$ cocatalyst at an Al:Mg molar ratio of 2.8 at 50° C. and a propylene partial pressure of 0.48 MPa produced polypropylene (2 h yield 200 g/mmol Zr) with a moderate degree of isotacticity; its melting point was 136–140° C. Polymerization of 4-methyl-1-pentene with the same catalyst at 55° C. also produced crystalline isotactic poly-(4-methyl-1-pentene) with a low yield.

Based on gas phase chromatography data, polymers prepared with metallocene catalysts activated with $AlR_2Cl$ and $MgR_2'$ have relatively broad molecular weight distributions, with $M_w/M_n$ values in the range of 10–15. However, ethylenealpha-olefin copolymers prepared with these catalysts have relatively narrow compositional distributions, an important indicator of single-site catalysis. Differential scanning calorimetry (DSC) and compositional analysis were carried out as described in U.S. Pat. No. 5,086,135 and in Nowlin et al., *Journal of Polymer Science, Part A: Polymer Chemistry,* 26, 755-764 (1988). DSC melting curves of several ethylene/1-hexene copolymers prepared with unsubstituted and ring-substituted zirconocene complexes, activated with $AlEt_2Cl$-$MgBu_2$ at relatively high [Al]:[Zr] ratios (over 1500), showed two indicators of single-site catalysis. The copolymers containing from 3 to 5 mol % of 1-hexene had quite narrow melting peaks, and their melting points were relatively low (100–125° C.), depending on composition. For example, as shown by DSC, a copolymer with a 1-hexene content of 2.0 mol %, prepared with a $Cp_2ZrCl_2$/$AlEt_2Cl$-$MgBu_2$ catalyst, had a $T_m$=118.7° C. (crystallinity 67%) and a copolymer with 1-hexene content of 5.2 mol %, prepared with a $C_2H_4(Ind)_2ZrCl_2$/$AlEt_2Cl$-$MgBu_2$ catalyst, had a $T_m$=99.6° C. (crystallinity 26%). Supported catalysts activated with $AlR_2Cl$-$MgR_2'$ cocatalysts also produced ethylene copolymers with uniform compositional distributions. Their melting points are uniformly low, as shown in Table 3.

TABLE 3

| | | | | |
|---|---|---|---|---|
| $C_{Hex}^{copol}$ | 2.4 | 3.4 | 4.7 | 4.4 |
| Tm (° C.) | 114.7 | 106.9 | 106.6 | 105.1 |

Although not wishing to be bound by theory, a possible active site formation mechanism probably includes alkylation of zirconocene complexes with $AlR_2R'$ formed in the reaction between $AlR_2Cl$ and $MgR_2'$ and the formation of cationic metallocene species $Cp_2Zr^+$—R via interaction between alkylated zirconocenes and $MgCl_2$. Chain growth reactions with $AlR_2Cl$-$MgR_2'$ activated metallocene complexes proceed in the same manner as with MAO-activated metallocene complexes. The principal chain termination reaction is β-hydride elimination. In the case of an ethylene/1-hexene copolymer (prepared with $Cp_2ZrCl_2$-$AlEt_2Cl$-$MgBu_2$ cocatalyst in toluene at 85° C.) it produces two chain-end double bonds:

$$Zr^+—CH_2—CH_2—R \rightarrow Zr^+—H + CH_2{=}CH—R$$

when the last monomer unit in the chain is ethylene, and $$Zr^+—CH_2—C(C_4H_9)H—R \rightarrow Zr^+—H + CH_2{=}C(C_4H_9)—R$$

when the last monomer unit in the chain is a 1-hexene unit. Comparison of chain-end composition with the overall copolymer composition (by IR) shows that the probability of the second reaction is about 20 times higher.

Additional features of the present invention are illustrated in the following non-limiting examples.

EXAMPLES $^{13}C$ NMR spectra of organometallic compounds were recorded at 100.4 MHz on a JEOL Eclipse 400 NMR spectrometer at 20° C. $^{13}C$ NMR spectra of polymers were recorded using the same instrument at 130° C. under experimental conditions appropriate for acquiring quantitative spectra of polyolefins (pulse angle was 90° and the pulse delay was 15 s). Continuous $^1H$ decoupling was applied throughout. The samples were prepared as solutions in a 3:1 mixture of 1,3,5-trichlorobenzene and 1,2-dichlorobenzene-$d_4$. Copolymer compositions were measured by IR; they are reported as mol % of an α-olefin in the copolymers, $C_{olef}^{copol}$. Infrared spectra were recorded with a Perkin-Elmer Paragon 1000 spectrophotometer. X-ray diffraction patterns were recorded with a Phillips PW 1877 automated powder diffractometer.

Catalyst Preparation

EXAMPLE 1

Under an inert atmosphere and at room temperature, 0.056 g of ethylenebis(1-indenyl)zirconium dichloride was added to a 50 mL serum bottle followed by 40 mL of anhydrous toluene. The contents of the serum bottle were heated to 55° C. in an oil bath for 30 minutes to produce a yellow solution. Finally, the serum bottle was removed from the oil bath and the contents were allowed to cool to room temperature.

EXAMPLE 2

Under an inert atmosphere and at room temperature, 0.0418 g of ethylenebis(1-indenyl)zirconium dichloride was added to a 100 mL round-bottom flask. Next, 3.0 mmol diethylaluminum chloride solution in toluene was added, followed by 1.0 mmol of dibutylmagnesium (DBM) solution in toluene. then, 5 mL of anhydrous toluene was added. Finally, 1.0 g of Davison grade 955 silica, previously calcined at 600° C. for about 12 hours, was added. The round-bottom flask was placed in an oil bath at 55° C., and after about 10 minutes, the solvent was removed from the flask using a nitrogen purge, to produce 1.32 g of a peach-colored free-flowing powder.

EXAMPLE 3

Under an inert atmosphere and at room temperature, 0.056 g of ethylenebis(1-indenyl)zirconium dichloride was added to a 50 mL serum bottle, followed by 0.922 g of a 14.9 wt % solution of trimethylaluminum in heptane and 40.0 g of anhydrous toluene. The contents of the bottle were well shaken, to form a yellow solution.

EXAMPLE 4

Under an inert atmosphere and at room temperature, 0.196 g of dimethylsilyl(cyclopentadienyl)(9-fluorenyl) zirconium dichloride was added to a 50 mL serum bottle. Then, 5 mL of toluene, 5 mL of a 1.43 M solution of trimethylaluminum in heptane, 10 mL of a 1.07M solution of dimethylaluminum chloride in toluene, and 5 mL of a 0.65M solution of dibutylmagnesium in toluene were added sequentially. A dark purple gel (viscous) solution formed immediately after the addition of the dibutylmagnesium. The contents of the serum bottle were well shaken to provide a dark purple viscous solution.

EXAMPLE 5

Under an inert atmosphere and at room temperature, 0.222 g of dimethylsilyl(cyclopentadienyl)(9-fluorenyl) zirconium dichloride was added to a 30 mL serum bottle. Then, 10 mL of a 1.07 M solution of dimethylaluminum chloride in toluene, and 4 mL of a 0.65M solution of dibutylmagnesium in toluene were added sequentially. The contents of the bottle were well shaken to provide a dark purple viscous solution. Next, 3.026 g of Davison grade 955 silica, previously calcined at 600° C, was added to a 100 mL round-bottom flask containing a large magnetic stir bar. The entire contents of the serum bottle were added to the round-bottom flask, and the serum bottle was rinsed with 15 mL of anhydrous toluene, with the rinse solution also added to the round bottom flask. The round bottom flask was placed in an oil bath at 53° C. and stirred using the magnetic stir bar for 60 minutes. After this time, the solvents were removed with a nitrogen purge to yield 4.205 g of a free-flowing powder.

Polymerizations (ethylene1-hexene copolymerization)

EXAMPLE 6

A 2.5 L stainless steel autoclave under a slow nitrogen purge at 50° C. was filled sequentially with 450 mL of anhydrous heptane, 200 mL of anhydrous 1-hexene, 150 mL of heptane, 6.3 mL of a 25 wt % solution of diethylaluminum chloride in heptane, 3.9 mL of a solution of dibutylmagnesium (2.43 wt % Mg) in heptane and 200 mL of heptane. The reactor was closed, the stirring rate adjusted to 1050 rpm, and the internal temperature was increased to 85° C. Ethylene was introduced to maintain the internal pressure at about 202 psi. Next, 5.0 mL of the yellow solution of EXAMPLE 1 was added to the autoclave and the reactor temperature was adjusted to 90° C. The polymerization was continued for 60 minutes, and then the ethylene supply was stopped and the reactor allowed to cool to room temperature. The polyethylene was collected and air dried. The yield was 115 g. The polymer melt index (MI) was determined to be 108, the polymer contained 4.7 mol % 1-hexene, and the polymer exhibited a melting point peak of 106.65° C. Catalyst activity expressed as kg of polyethylene per gram zirconium under the polymerization conditions described above was 75.6kg/g Zr.

EXAMPLE 7

A 2.5 L stainless steel autoclave under a slow nitrogen purge at 50° C. was filled sequentially with 450 mL of anhydrous heptane, 200 mL of anhydrous 1-hexene, 150 mL of heptane, 6.3 mL of a 25 wt % solution of diethylaluminum chloride in heptane, 3.9 mL of a solution of dibutylmagnesium (2.43 wt % Mg) in heptane and 200 mL of heptane. The reactor was closed, the stirring rate adjusted to 1050 rpm, and the internal temperature was increased to 85° C. Ethylene was introduced to maintain the internal pressure at about 202 psi. Next, 0.2246 g of the solid catalyst of EXAMPLE 2 was added to the autoclave and the reactor temperature was adjusted to 90° C. The polymerization was continued for 60 minutes, and then the ethylene supply was stopped and the reactor allowed to cool to room temperature. The polyethylene was collected and air dried. The yield was 113 g. The polymer melt index (MI) was determined to be 113, the polymer contained 4.35 mol % 1-hexene, and the polymer exhibited a melting point peak of 105.09° C. Catalyst activity expressed as kg of polyethylene per g zirconium under the polymerization conditions described above was 85.6 kg/g Zr.

EXAMPLE 8

A 2.5 L stainless steel autoclave under a slow nitrogen purge at 50° C. was filled sequentially with 450 niL of anhydrous heptane, 100 mL of anhydrous 1-hexene, 150 mL of heptane, 6.3 mL of a 25 wt % solution of diethylaluminum chloride in heptane, 3.9 mL of a solution of dibutylmagnesium (2.43 wt % Mg) in heptane and 200 mL of heptane. The reactor was closed, the stirring rate adjusted to 1050 rpm, and the internal temperature was increased to 85° C. Ethylene was introduced to maintain the internal pressure at about 202 psi. Next, 4.7 mL of the solution of EXAMPLE 3 was added to the autoclave and the reactor temperature was adjusted to 90° C. The polymerization was continued for 60 minutes, and then the ethylene supply was stopped and the reactor allowed to cool to room temperature. The polyethylene was collected and air dried. The yield was 91.2 g. The polymer melt index (MI) was determined to be 51, the polymer contained 2.65 mol % 1-hexene, and the polymer exhibited a melting point peak of 114.9° C. Catalyst activity expressed as kg of polyethylene per g Zr under the polymerization conditions described above was 75.1 kg/g Zr.

EXAMPLE 9

A 2.5 L stainless steel autoclave under a slow nitrogen purge at 50° C. was filled sequentially with 450 mL of anhydrous heptane, 100 mL of anhydrous 1-hexene, 150 mL of heptane, 5.4 mL of a 25 wt % solution of diethylaluminum chloride in heptane, 3.5 mL of a solution of dibutylmagnesium (2.43 wt % Mg) in heptane and 200 mL of heptane. The reactor was closed, the stirring rate adjusted to 1050 rpm, and the internal temperature was increased to 85° C. Ethylene was introduced to maintain the internal pressure at about 202 psi. Next, 1.0 mL of the solution of EXAMPLE 4 was added to the autoclave and the reactor temperature was adjusted to 90° C. The polymerization was continued for 60 minutes, and then the ethylene supply was stopped and the reactor allowed to cool to room temperature. The polyethylene was collected and air dried. The yield was 122 g. The polymer melt index (MI) was determined to be 4.8, the polymer contained 3.43 mol % 1-hexene, and the polymer exhibited a melting point peak of 106.88° C. Catalyst activity expressed as kg of polyethylene per g Zr under the polymerization conditions described above was 73.5 kg/g Zr.

EXAMPLE 10

A 2.5 L stainless steel autoclave under a slow nitrogen purge at 50° C. was filled sequentially with 450 mL of anhydrous heptane, 50 mL of anhydrous 1-hexene, 150 mL of heptane, 5.4 mL of a 25 wt % solution of diethylaluminum chloride in heptane, 3.5 mL of a solution of dibutylmagnesium (2.43 wt % Mg) in heptane and 200 niL of heptane. The reactor was closed, the stirring rate adjusted to 1050 rpm, and the internal temperature was increased to 85° C. Ethylene was introduced to maintain the internal pressure at about 202 psi. Next, 0.2348 g of the catalyst of Example 5 was added to the autoclave and the reactor temperature was adjusted to 90° C. The polymerization was continued for 60 minutes, and then the ethylene supply was stopped and the reactor allowed to cool to room temperature. The polyethylene was collected and air dried. The yield was 18.5 g. The polymer melt index (MI) was determined to be 3.7, and the high load melt index (HLMI) was 66.6, with the ratio HLMIMI =18, indicating a very narrow molecular weight distribution as provided by a single-site catalyst. Catalyst activity expressed as kg of polyethylene per g Zr under the polymerization conditions described above was 8.2 kg/g Zr.

EXAMPLE 11

A 2.5 L stainless steel autoclave under a slow nitrogen purge at 50° C. was filled sequentially with 450 mL of anhydrous heptane, 100 mL of anhydrous 1-hexene, 150 mL of heptane, 8.0 mL of a solution containing 6.16 mmol of diethylaluminum chloride and 2.6 mmol of trimethylaluminum in heptane, 2.9 mL of a solution of dibutylmagnesium (2.43 wt % Mg) in heptane and 200 mL of heptane. The reactor was closed, the stirring rate adjusted to 1050 rpm, and the internal temperature was increased to 85° C. Ethylene was introduced to maintain the internal pressure at about 202 psi. Next, 0.2280 g of the catalyst of Example 2 was added to the autoclave and the reactor temperature was adjusted to 90° C. The polymerization was continued for 60 minutes, and then the ethylene supply was stopped and the reactor allowed to cool to room temperature. The polyethylene was collected and air dried. The yield was 71.3 g of polyethylene containing 2.45 mol % of 1-hexene and exhibiting a melting point peak at 114.66° C. The polymer melt index (MI) was determined to be 30.9, and the high load melt index (HLMI) was 571, with the ratio HLMIMI=18.4, indicating a very narrow molecular weight distribution as provided by a single-site catalyst. Catalyst activity expressed as kg of polyethylene per g Zr under the polymerization conditions described above was 54.0 kg/g Zr.

Examples 1–11 are summarized in Table 4.

TABLE 4

Summary of Examples

| Catalyst From Example No. | Polymer From Example No. | Activity (kg PE/g Zr) | Activator[a] |
|---|---|---|---|
| 1 | 6 | 75.6 | DEAC/DBM |
| 2[b] | 7 | 85.6 | DEAC/DBM |
| 3 | 8 | 75.1 | DEAC/DBM |
| 4 | 9 | 73.5 | DEAC/DBM |
| 5[b] | 10 | 8.2 | DEAC/DBM |
| 2[b] | 11 | 54.0 | DMAC/TMA/DBM |

[a]DEAC = diethylaluminum chloride; DBM = dibutylmagnesium; DMAC = dimethylaluminum chloride; TMA = trimethylaluminum
[b]catalyst was supported on silica These catalyst preparation and olefin polymerization examples clearly illustrate that metallocene compounds may be activated with mixtures of a dialkylaluminum chloride (DEAC or DMAC) and a magnesium alkyl (DBM) to produce olefin polymerization catalysts with high activity. Examples 2 and 5 illustrate further than these catalysts can be supported on silica. The characterization of the polymer samples prepared with these olefin polymerization catalysts indicates that the polymer has a uniform comonomer distribution as indicated by the relatively low melting point of the polymer and a narrow MWD as provided from single-site olefin polymerization catalysts.

The various patents and publications cited in this disclosure are incorporated herein by reference in their entirety. Other publications not specifically addressed above but providing useful information for the appreciation and practice of the present invention include U.S. Pat. No. 5,086,135 and Kissin et al., Macromolecules 33, 4599-4601 (2000), the disclosures of which are also incorporated herein by reference.

We claim:

1. A catalyst composition comprising:

(a) a metallocene; and (b) a cocatalyst comprising:

(i) a halo-organoaluminum compound of the formula $$Al_nR_mX_{3n-m}$$

where Al is aluminum, each R is independently a $C_1$ to $C_4$ alkyl group, X is a halide, n is 1 or 2, and m is determined by the valency of Al; and (ii) a dialkylmagnesium compound of the formula $MgR'_2$ where Mg is magnesium and R' is a $C_2$ to $C_6$ alkyl group.

2. The catalyst composition of claim 1, wherein each R is independently ethyl or methyl.

3. The catalyst composition of claim 1, wherein X is chloride or fluoride.

4. The catalyst composition of claim 1, wherein R' is butyl or hexyl.

5. The catalyst composition of claim 1, wherein the halo-organoaluminum compound is selected from the group consisting of $AlEt_2Cl$, $AlMe_2Cl$, $Al_2Et_3Cl_3$ and $AlEt_2F$, where Me is methyl and Et is ethyl.

6. The catalyst composition of claim 1, wherein the halo-organoaluminum compound is $AlEt_2Cl$, where Et is ethyl.

7. The catalyst composition of claim 1, wherein the dialkylmagnesium compound is $MgBu_2$, where Bu is butyl.

8. The catalyst composition of claim 1, wherein the halo-organoaluminum compound and the dialkylmagnesium compound are present in amounts such that the molar ratio of Al to Mg is at least 2.

9. The catalyst composition of claim 1, wherein the halo-organoaluminum compound and the dialkylmagnesium compound are present in amounts such that the molar ratio of Al to Mg is from 2:1 to 5:1.

10. The catalyst composition of claim 1, wherein the metallocene catalyst is a titanocene, zirconocene or a hafnocene.

11. The catalyst composition of claim 1, further comprising a support.

12. The catalyst composition of claim 11, wherein the support is silica.

13. A supported metallocene catalyst comprising:

(a) a support;

(b) a titanocene, zirconocene or hafnocene; and (c) a cocatalyst comprising:

(i) a halo-organoaluminum compound of the formula $Al_nR_mX_{3n-m}$ where Al is aluminum, each R is independently methyl or ethyl, X is chlorine or fluorine, n is 1 or 2, and m is determined by the valency of Al;

and (ii) a dialkylmagnesium compound of the formula $MgR'_2$ where Mg is magnesium and R' is hexyl or butyl.

14. The supported metallocene catalyst of claim 13, wherein the halo-organoaluminum compound is selected from the group consisting of $AlEt_2Cl$, $AlMe_2Cl$, $Al_2Et_3Cl_3$ and $AlEt_2F$, where Me is methyl and Et is ethyl.

15. The supported metallocene catalyst of claim 13, wherein the halo-organoaluminum compound and the dialkylmagnesium compound are present in amounts such that the molar ratio of Al to Mg is from 2:1 to 5:1.

16. The supported metallocene catalyst of claim 13, wherein the support is silica.

17. A method of forming a polyolefin catalyst, the method comprising:

(a) providing a supported metallocene catalyst comprising a support, a metallocene and an activator, the activator comprising:

(i) a halo-organoaluminum compound of the formula $Al_nR_mX_{3n-m}$ where Al is aluminum, each R is independently a $C_1$ to $C_4$ alkyl group, X is a halide, n is 1 or 2, and m is determined by the valency of Al; and (ii) a dialkylmagnesium compound of the formula $MgR'_2$ where Mg is magnesium and R' is a $C_2$ to $C_6$ alkyl group;

(b) providing a monomer selected from the group consisting of ethylene, $C_3$–$C_{20}$ alpha-olefins, and mixtures thereof, and (c) contacting the monomer with the supported metallocene catalyst system for a time and under conditions sufficient to polymerize the monomers to form a polyolefin polymer.

18. The method of claim 17, wherein the monomer is ethylene.

19. The method of claim 17, wherein the monomer is a mixture of ethylene and at least one $C_3$–$C_{20}$ alpha olefin.

20. The method of claim 17, wherein the monomer is a mixture of ethylene and 1 -hexene.

* * * * *